United States Patent
Kim et al.

(10) Patent No.: US 8,225,344 B2
(45) Date of Patent: Jul. 17, 2012

(54) VIDEO PROCESSING APPARATUS AND METHOD

(75) Inventors: Do-young Kim, Gyeonggi-do (KR); Eun-kyung Kang, Seoul (KR); Doo-hee Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1013 days.

(21) Appl. No.: 11/510,567

(22) Filed: Aug. 28, 2006

(65) Prior Publication Data

US 2007/0061836 A1    Mar. 15, 2007

(30) Foreign Application Priority Data

Sep. 15, 2005    (KR) .................. 10-2005-0086491

(51) Int. Cl.
- H04N 7/16 (2011.01)
- G06F 7/04 (2006.01)
- G06F 15/16 (2006.01)
- G06F 17/30 (2006.01)
- H04L 29/06 (2006.01)

(52) U.S. Cl. ............. 725/25; 725/28; 726/9; 380/210

(58) Field of Classification Search .............. None
See application file for complete search history.

(56) References Cited

U.S. PATENT DOCUMENTS

| | | |
|---|---|---|
| 6,674,858 B1 | 1/2004 | Kimura et al. |
| 7,240,113 B1* | 7/2007 | Barry et al. ............ 709/225 |
| 7,580,522 B2* | 8/2009 | Kangas ................... 380/210 |
| 2002/0101991 A1* | 8/2002 | Bacon et al. ............ 380/212 |
| 2005/0160015 A1* | 7/2005 | Shin ........................ 705/26 |
| 2005/0226415 A1* | 10/2005 | Kubota et al. .......... 380/210 |

FOREIGN PATENT DOCUMENTS

| | | |
|---|---|---|
| JP | 2003-116115 A | 4/2003 |
| KR | 0263294 | 5/1994 |
| KR | 10-2000-0005735 A | 1/2000 |
| KR | 10-0377845 B1 | 3/2003 |
| KR | 10-2004-0076739 A | 9/2004 |

OTHER PUBLICATIONS

Chinese Office Action, dated Mar. 23, 2011, issued in Application No. 200610151541.X.
Chen, et al, "A Design and Implementation of Multycrypt for DVB Conditional Access System" China Academic Journal Electronic Publishing House, http://www.cnki.net DSP Center, Institute of Acoustics, Chinese Academy of Sciences, Beijing 100080, China, Jun. 2003.
Communication issued Aug. 27, 2010 by State Intellectual Property Office of P.R. China in counterpart Chinese Application No. 200610151541.X.

* cited by examiner

Primary Examiner — Mark D Featherstone
(74) Attorney, Agent, or Firm — Sughrue Mion, PLLC

(57) ABSTRACT

The present invention relates to a video processing apparatus that includes: a signal receiver receiving an encrypted video signal which contains access rights information of a transmitting side and decryption information; an information extractor extracting the access rights information of the transmitting side and the decryption information from the video signal; an encryption processor decrypting the encrypted video signal based on the decryption information; an access rights information storage unit storing access rights information of a receiving side; and a controller sending the decryption information to the encryption processor if it is determined that the access rights information of the transmitting side matches the access rights information of the receiving side.
Accordingly, the video processing apparatus and method processes access rights with respect to a video signal that is granted only to an authorized user, with a high degree of reliability.

19 Claims, 4 Drawing Sheets

VIDEO PROCESSING APPARATUS AND METHOD

CROSS-REFERENCE TO RELATED APPLICATIONS

This application claims priority from Korean Patent Application No. 2005-0086491, filed on Sep. 15, 2005, in the Korean Intellectual Property Office, the disclosure of which is incorporated herein by reference.

BACKGROUND OF INVENTION

1. Field of Invention

The present invention relates to a video processing apparatus and method, and more particularly, to a video processing apparatus and method capable of processing access rights to a video that only an authorized user can view, with a high degree of reliability.

2. Description of the Related Art

A video processing apparatus such as a set-top box, a television and so on, receives video signals containing a video from broadcasting stations as over-the-air TV broadcasting signals, cable TV broadcasting signals and the like, or receives video signals from various video apparatuses such as a video cassette recorder (VCR) and a digital versatile disk (DVD) player. The apparatus conducts the appropriate video processing on the received or input video signals, and then outputs the processed video. Particularly, a video processing apparatus such as a cable set-top box and a cable-ready television can receive and properly process cable TV broadcast signals.

A cable TV system that broadcasts cable TV signals is configured with a multiple services operator (MSO) and a cable television headend (hereafter, referred to as a headend). The MSO provides diverse cable TV services including multimedia services for video and audio, and data services for data information. The headend receives the cable TV signals from the MSO, processes, and distributes the received signals. While communicating data with the MSO over a network, the headend receives incoming service signals and forwards them to a cable network which has a local cable infrastructure.

A cable set-top box or a cable-ready TV receives the cable TV service signals from the headend over the cable network and properly processes the received signals so as to provide the services to a user. A TV connected to the cable set-top box or the cable-ready TV outputs video or audio, or provides data services to the user based on the processed signals.

In such cable TV broadcasting system, certain services among the provided services can be accessed only by an authorized user. Such access control is called conditional access (CA). One of the CA implementation schemes is to operate the cable set-top box or the cable-ready TV in conjunction with a CA processing device called a Point of Deployment (POD) module. For example, according to the OPENCABLE™ specification, a CABLECARD™ can be mounted in the cable set-top box or the cable-ready TV as the POD module to process the CA. The POD module selectively decrypts or descrambles encrypted or scrambled video signals which have been received at the cable set-top box or the cable-ready TV. Hereafter, the POD is referred to as a "cable card", and the cable set-top box or the cable-ready TV is referred to as a "host" in relation with the cable card.

FIG. 1 depicts CA operations between a conventional host and cable card. When a user selects a scrambled channel at a host, the host sends to the cable card a message ca_info_inq inquiring about information relating to the CA, at operation S1. In response to this message, the cable card sends its held CA-related information ca_info to the host, at operation S2. Since this procedure can be performed in cases when, for example, the cable card is initially mounted to the host, it is called initialization. The information ca_info includes CA_system_ID which is an identifier of the CA system.

Next, the host receives cable TV broadcast signals from the headend and sends a CA program map table CA PMT containing access rights information of the user in relation with the current channel and a message ca_pmt_cmd_id inquiring about the user's access rights to the POD, at operation S3. The access rights information of the user in relation with the current channel may be a CA descriptor, by way of example. The cable card replies to the host with a message ca_pmt_reply indicating the access rights information of the user with respect to the current channel, at operation S4. At this time, the cable card determines whether or not the user is authorized to access the current channel, based on the received CA descriptor. The message ca_pmt_reply indicating whether or not the user is authorized to access the current channel contains information CA_enable indicative of whether the current channel is descrambled. In response to this message, the host sends a message ca_pmt_cmd_id indicating a subsequent action, to the cable card, at operation S5.

However, the host may receive from the headend an improper CA descriptor or a plurality of CA descriptors as the CA descriptor which is the criterion to determine whether the user is authorized to access the current channel. FIG. 2 outlines operations of the conventional host and cable card in this situation.

If the user selects a scrambled channel at the host, at operation S11, the host receives an improper CA descriptor or a plurality of CA descriptors from the headend, at operation S12. The host generates a CA PMT message using the improper CA descriptor or the plurality of CA descriptors at operation S13, and sends the generated CA PMT message to the cable card, at operation S14. Since the transferred CP descriptor is improper or plural in number, the cable card determines that the user is not authorized to access the current channel. Then, at operation S15 the cable card responds to the host with a message indicating the result of the determination. Because it is determined that the user is not authorized for the current channel, the host cannot decode the current channel, and thus displays no video, at operation S16.

As discussed above, in the case where the host sends an improper CA descriptor or plural CA descriptors to the cable card, the related art has the disadvantage that the user cannot view the current channel even though the user is authorized to access the current channel.

SUMMARY OF THE INVENTION

Accordingly, it is an aspect of an embodiment of the present invention to provide a video processing apparatus and method for processing access rights with respect to a video which is granted only to an authorized user, with a high degree of reliability.

Additional aspects of embodiments of the invention will be set forth in the description which follows, and in part will be apparent from the description, or may be learned by practice of the invention.

The foregoing and/or other aspects of embodiments of the present invention can be achieved by providing a video processing apparatus comprising: a signal receiver receiving an encrypted video signal which contains access right information of a transmitting side and decryption information; an information extractor extracting the access right information of the transmitting side and the decryption information from the video signal; an encryption processor decrypting the encrypted video signal based on the decryption information; an access right information storage storing access right information of a receiving side; and a controller sending the decryption information to the encryption processor when it is determined that the access right information of the transmitting side matches the access right information of the receiving side.

According to an aspect of an embodiment of the present invention, the controller receives the access right information of the receiving side from the encryption processor and stores the received information in the access right information storage.

The foregoing and/or other aspects of embodiments of the present invention can be achieved by providing a video processing apparatus connected to an encryption processing device which stores access right information of a receiving side and decrypts an encrypted video signal based on decryption information, the apparatus comprising: a signal receiver receiving an encrypted video signal which contains access right information of a transmitting side and the decryption information; an information extractor extracting the access right information of the transmitting side and the decryption information from the video signal; and a controller receiving the access right information of the receiving side from the encryption processing device and sending the decryption information to the encryption processing device when it is determined that the access right information of the transmitting side extracted by the information extractor matches the access right information of the receiving side stored in the encryption processing device.

The foregoing and/or other aspects of embodiments of the present invention can be achieved by providing a video processing method of a video processing apparatus which comprises an access right storage storing access right information of a receiving side, the method comprising: receiving an encrypted video signal which contains access right information of a transmitting side and decryption information; extracting the access right information of the transmitting side and the decryption information from the video signal; checking whether the access right information of the transmitting side matches the access right information of the receiving side; and decrypting the encrypted video signal based on the extracted decryption information when it is determined that the access right information of the transmitting side matches the access right information of the receiving side.

The foregoing and/or other aspects of embodiments of the present invention can be achieved by providing a video processing method of a video processing apparatus connected to an encryption processing device which stores access right information of a receiving side and decrypts an encrypted video signal based on decryption information, the method comprising: receiving an encrypted video signal which contains access right information of a transmitting side and the decryption information; extracting the access right information of the transmitting side and the decryption information from the video signal; receiving the access right information of the receiving side from the encryption processing device; checking whether the access right information of the transmitting side matches the access right information of the receiving side; and sending the extracted decryption information to the encryption processing device when it is determined that the access right information of the transmitting side matches the access right information of the receiving side.

It is to be understood that both the foregoing general description and the following detailed description are exemplary and explanatory and are intended to provide further explanation of embodiments of the invention as claimed.

BRIEF DESCRIPTION OF THE DRAWINGS

The above and/or other aspects and advantages of embodiments of the prevent invention will become apparent and more readily appreciated from the following description of the exemplary embodiments, taken in conjunction with the accompany drawings, in which.

Figure 1:
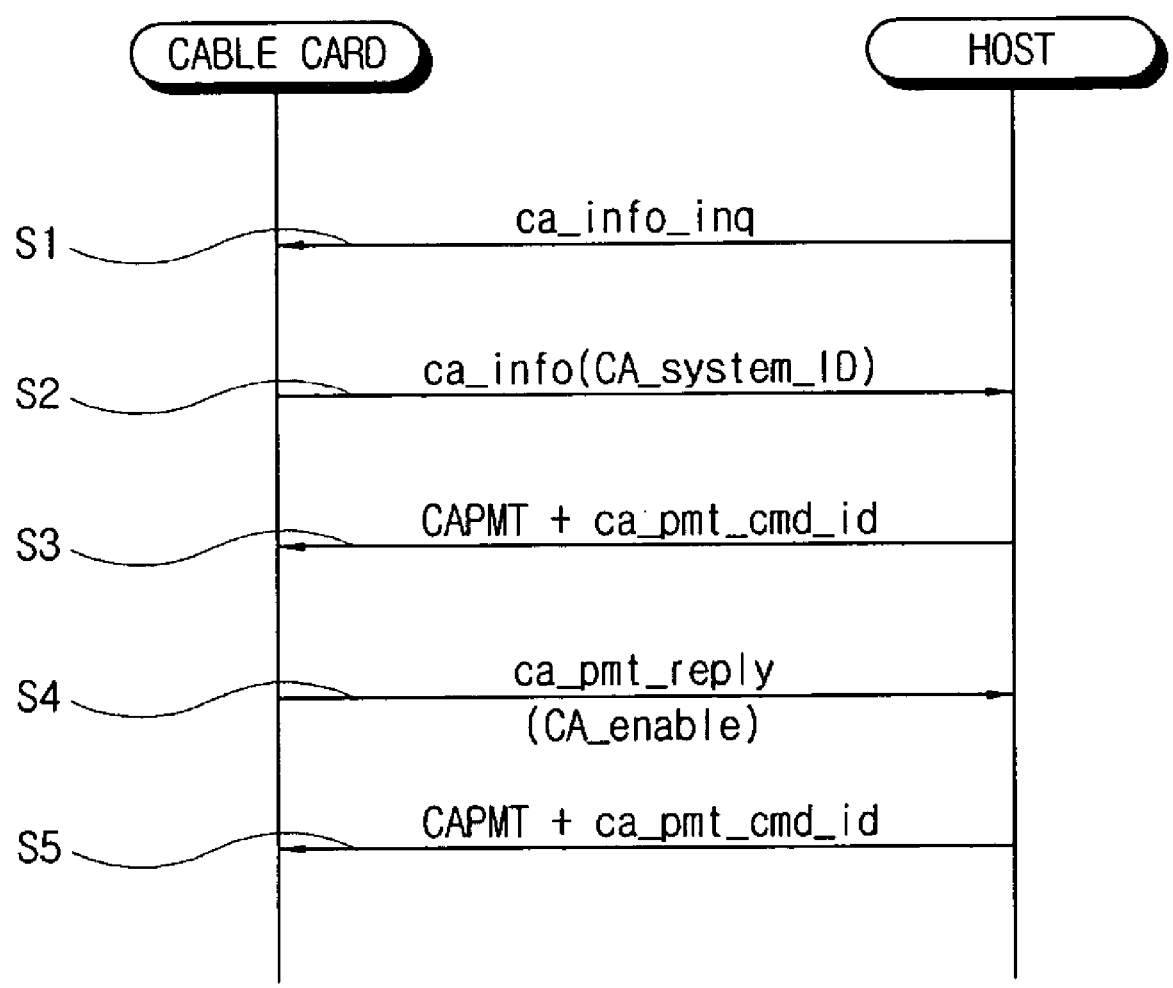
FIG. 1 is a diagram illustrating CA operations of a conventional host and cable card.
Figure 2:
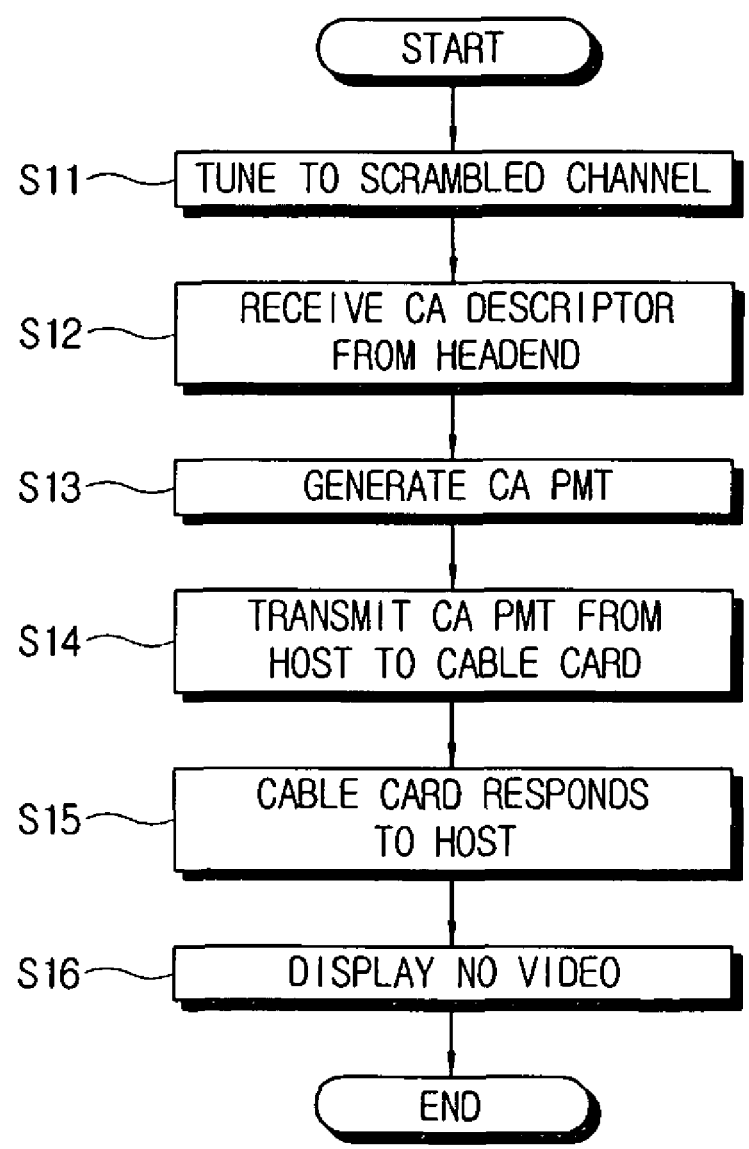
FIG. 2 is a flowchart explaining the operations of a conventional host and cable card to process an improper CA descriptor.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain various embodiments of the present invention by referring to the figures.

Figure 3:
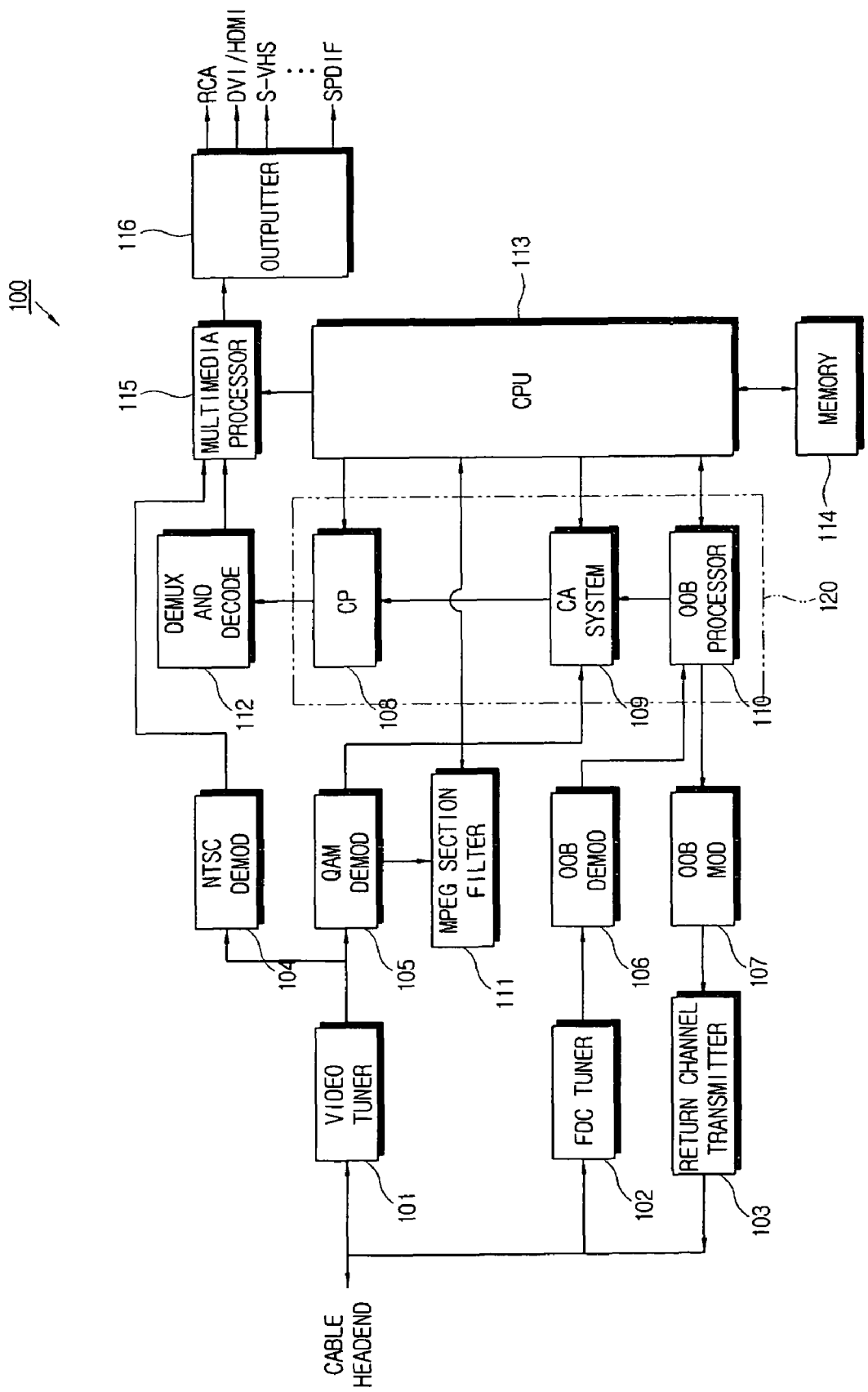
FIG. 3 is a block diagram of a video processing apparatus according to an exemplary embodiment of the present invention.

FIG. 3 is a block diagram of a video processing apparatus 100 according to an exemplary embodiment of the present invention. The video processing apparatus 100 extracts a signal provided by a cable TV service from a radio frequency (RF) signal which is received from a headend (not shown) over a cable network (not shown). The video processing apparatus 100 processes multimedia data including video and audio based on the extracted signal, and outputs the processed video and the audio.

The video processing apparatus 100, as shown in FIG. 3, includes a video tuner 101, a forward data channel (FDC) tuner 102, a return channel transmitter 103, a National Television Standards Committee (NTSC) demodulator (DEMOD) 104, a quadrature amplitude modulation (QAM) demodulator (DEMOD) 105, an out-of-band (OOB) demodulator (DEMOD) 106, an OOB modulator (MOD) 107, a copy protector (CP) 108, a conditional access (CA) system 109, an OOB processor 110, a Moving Picture Experts Group (MPEG) section filter 111, a demultiplexer (DEMUX) and decoder (DECODE) unit 112, a central processing unit (CPU) 113, a memory 114, a multimedia processor 115, and an outputter 116.

The video processing apparatus 100 can be implemented by connecting a cable set-top box or a cable-ready TV and a POD such as a CABLECARD™. In this case, the CP 108, the CA system 109 and the OOB processor 110 can be implemented using the POD, and the other components can be implemented using the cable set-top box or the cable-ready TV. In the exemplary embodiment of the present invention, the CP 108, the CA system 109 and the OOB processor 110 are an example of an encryption processor. Hereafter, the POD is referred to as a cable card 120, and the cable set-top box or the cable-ready TV is referred to as a host in relation to the cable card 120.

The video tuner 101 tunes to and receives a signal of a preset frequency from the RF signal transferred from the headend over the cable network. The video tuner 101 receives and outputs a signal at the frequency of a forward application transport (FAT) channel corresponding to the signal for the multimedia service provided from the MSO, for example, a signal having a frequency ranging from 54 MHz to 864 MHz. The NTSC DEMOD 104 is responsible for demodulating the analog channel signal among signals output from the video tuner 101. The QAM DEMOD 105 is responsible for processing the digital channel signal among the signals output from the video tuner 101, specifically, to demodulate the signal using 64-QAM or 256-QAM. The MPEG section filter 111 performs section filtering with respect to a MPEG-2 transport stream demodulated by the QAM DEMOD 105, extracts PMT data, and provides the extracted data to the CPU 113.

The FDC tuner 102 receives a signal carrying an OOB message over the OOB FDC channel by tuning to a frequency between 70 MHz to 130 MHz. In the exemplary embodiment of the present invention, the OOB message is a control and information message transmitted from the MSO to the host. The OOB message includes a CA message to control the access to the cable TV services, a system information (SI) message, an electronic program guide (EPG) message, an emergency alert system (EAS) message, and the like. The OOB DEMOD 106 outputs an OOB message by receiving and demodulating the signal output from the FDC tuner 102. In order to demodulate the OOB message, the OOB DEMOD 106 performs quadrature phase-shift keying (QPSK) demodulation.

The OOB processor 110 receives the OOB message from the OOB DEMOD 106, decrypts, and processes the OOB message according to a certain protocol. The CA system 109 is provided with the multimedia data from the QAM DEMOD 105 and processes the access rights for the multimedia data. According to an exemplary embodiment of the present invention, the CA system 109 holds CA-related information ca_info which is reference information for the CA processing. The CA-related information ca_info is an identifier of the CA system 109 CA_system_ID. Alternatively, the CA-related information ca_info may be a manufacturer ID of the cable card 120. The CA-related information ca_info is a non-limiting example of the access rights information for the receiving side. The CP 108 carries out a process to prevent the unauthorized copying of the multimedia data.

The DEMUX and DECODE unit 112 demultiplexes the multimedia data input from the CA system 109 into video, audio and data, and decodes the video, the audio and the data. The multimedia processor 115 conducts NTSC encoding, graphic processing, vertical blanking interval (VBI) data insertion, AC-3 decoding, image processing, and so on with respect to the video, the audio and the data input from the NTSC DEMOD 104 and the DEMUX and DECODE unit 112. The outputter 116 outputs signals in various video and audio formats such as RCA, DVI/HDMI, S-VHS, S/PDIF and so on, which have been processed by the multimedia processor 115.

When upstream information is transmitted from the host to the headend over a reverse data channel (RDC), the OOB MOD 107 and the return channel transmitter 103 modulate and transfer data received from the OOB processor 110.

Figure 4:
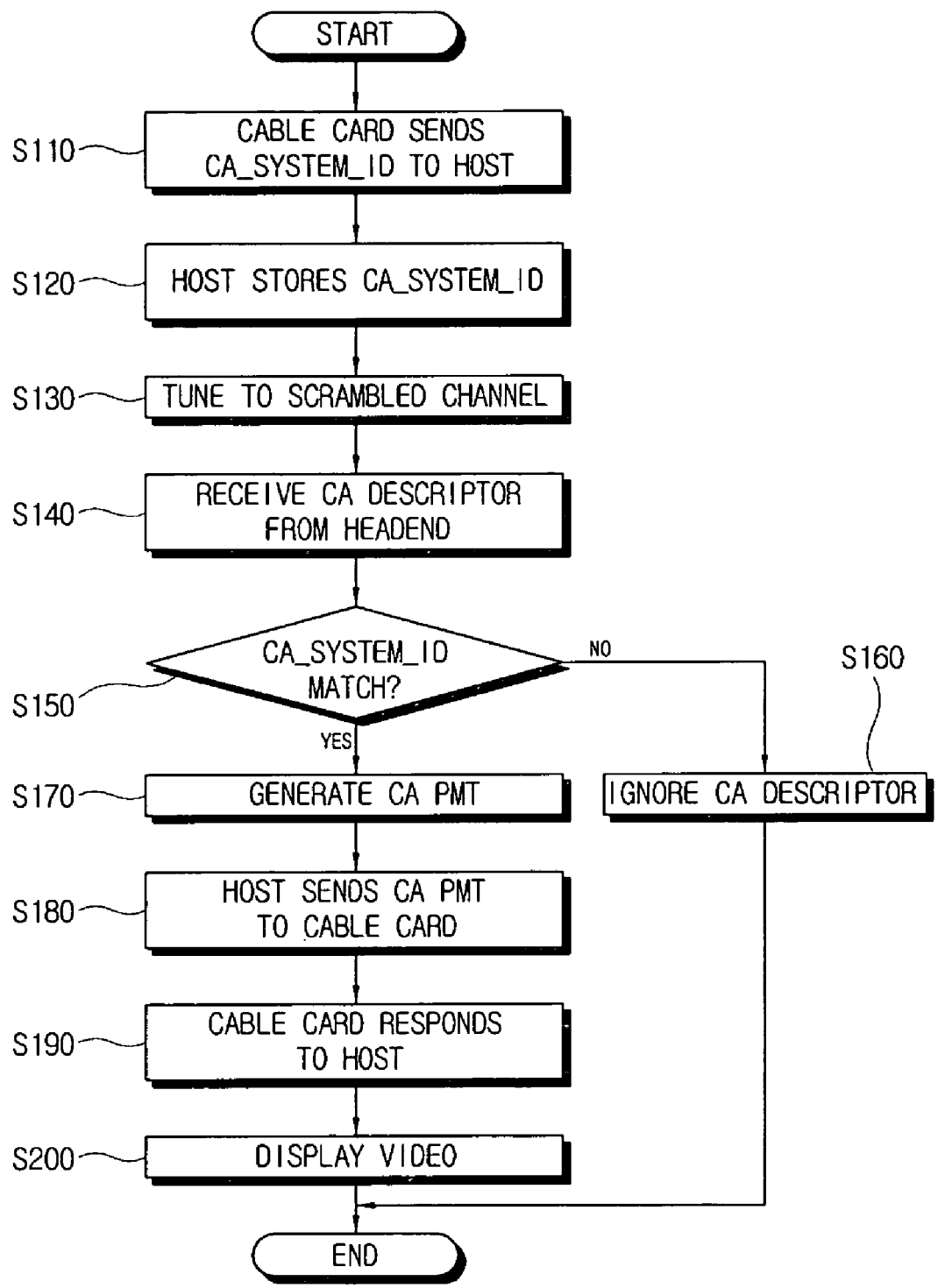
FIG. 4 is a flowchart explaining the operations of a host and a cable card which process the CA related information according to an exemplary embodiment of the present invention.

The CPU 113 controls the overall operations of the host, and checks for errors in the CA descriptor received from the headend by communicating information with the CA system 109 so that the CA processing can be carried out with a high degree of reliability, which will be explained in detail with reference to FIG. 4. FIG. 4 is a flowchart explaining operations of the host and the cable card 120 for processing the CA according to an exemplary embodiment of the present invention.

At initialization, in the case where the cable card 120 is mounted in the host, if the CPU 113 of the host requests the CA-related information from the CA system 109 of the cable card 120, the CA system 109 sends the CA-related information ca_info to the CPU 113, at operation S110. The CPU 113 stores the received CA-related information ca_info in memory 114, at operation S120.

When the user selects a scrambled channel at the host, at operation S130, the video tuner 101 receives from the headend the video signal containing the CA descriptor which is the criterion for determining whether the user is authorized to access the current channel, at operation S140. In the exemplary embodiment of the present invention, the video signal received by the host additionally contains CA_system_ID which is the identifier of the CA system 109. The received video signal may include an improper CA descriptor or a plurality of CA descriptors. For instance, in the case where two CA descriptors are received, and two CA_system_IDs corresponding to the two CA descriptors are present: if one of the CA_system IDs of the received CA descriptors is the same as the CA_system_ID stored in the memory 114 of the host and the other is different from the stored identifier, an improper CA descriptor has been received. In the exemplary embodiment of the present invention, the CA descriptor is a non-limiting example of the decryption information, and CA_system_ID, which is the identifier of the CA system and appended to the video signal, is a non-limiting example of access rights information of the transmitting side.

The MPEG section filter 111 extracts the PMT data indicative of the CA descriptor and CA_system_ID by performing section filtering with respect to the received MPEG-2 transport stream, and provides the extracted PMT data to the CPU 113. The CPU 113 checks whether the received CA_system_ID matches the CA_system_ID stored in memory 114 based on the received PMT data, at operation S150. If the two CA_system_IDs do not match, the CPU 113 ignores the corresponding CA descriptor, at operation S160.

If the two CA_system_IDs match, the CPU 113, at operation S170, generates the CA PMT message based on the PMT data and, at operation S180, provides the generated CA PMT message to the CA system 109 of the cable card 120. The CA system 109 of the cable card 120 determines that the user is authorized to access the current channel based on the received CA descriptor and, at operation S190, responds to the host with a message indicating the result of the determination. In doing so, the CA system 109 descrambles the scrambled multimedia data and provides the descrambled data to the DEMUX and DECODE unit 112. The DEMUX and DECODE unit 112 allows the video to be displayed by normally decoding the received multimedia data at operation S200.

The CPU 113 can carry out its functions described here by executing certain computer programs. In this situation, these computer programs may be stored in a memory such as a flash memory.

Other alternative embodiments, other than those described here, can be used. For instance, although the video processing apparatus is described here as a combination of the host and the cable card, the invention is not limited to such a configuration as the video processing apparatus may be implemented using merely the host having the cable card therein. In this case, the video processing apparatus may exclude the CP 108, the CA system 109 and the OOB processor 110 from its components.

As set forth above, the video processing apparatus and method can process access rights in relation to a video granted only to an authorized user, with a high degree of reliability.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:
   a signal receiver receiving, through a channel selected by a user, an encrypted video signal which comprises decryption information and access rights information of a transmitting side with respect to a conditional access (CA) device;
   an information extractor extracting the access rights information of the transmitting side and the decryption information, from the received video signal; and
   a controller controlling a storage unit, which is not included in the CA device, to receive and store the access rights information of a receiving side with respect to the CA device, sending the extracted decryption information to the CA device if it is determined that the access rights information of the transmitting side matches the access rights information of the receiving side stored in the storage unit,
   wherein the CA device uses the decryption information received from the controller to determine whether the user is authorized to access the channel, and decrypts the encrypted video signal based on the decryption information received from the controller, and, if the user is determined as not being authorized, the CA device does not decrypt the encrypted video signal.

2. The video processing apparatus according to claim 1, wherein the controller requests from the CA device the access rights information of the receiving side to store in the storage unit, when the video processing apparatus is connected to the CA device for initialization.

3. A video processing method for a video processing apparatus which is connected to a conditional access (CA) device, the method comprising:
   receiving, through a channel selected by a user, an encrypted video signal which contains access rights information of a transmitting side with respect to the CA device and decryption information;
   storing the access rights information of a receiving side with respect to the CA device in a storage unit which is not included in the CA device;
   extracting the access rights information of the transmitting side and the decryption information, from the video signal;
   determining whether the access rights information of the transmitting side matches the access rights information of the receiving side;
   sending the extracted decryption information to the CA device if it is determined that the access rights information of the transmitting side matches the access rights information of the receiving side stored in the storage unit;
   determining by the CA device whether the user is authorized to access the channel based on the received decryption information; and
   decrypting the encrypted video signal based on the received decryption information,
   wherein, if the user is determined as not being authorized, the encrypted video signal is not decrypted in the decrypting the encrypted video signal.

4. The method of claim 3, wherein the storage unit is included in the video processing apparatus.

5. A video processing system for decrypting an encrypted video signal received, through a channel selected by a user, from a transmitter, the video processing system comprising:
   a host device including a processor and a memory, the host device receiving, from the transmitter, the encrypted video signal which contains an identifier of a conditional access (CA) system (CA_System_ID) and decryption information, the CA system being provided for decrypting the encrypted video signal; and
   a point of deployment (POD) device comprising the CA system, wherein the POD device sends a CA_System_ID of the CA system stored in the CA system to the host device,
   wherein the host device controls the memory to store the CA_System_ID of the CA system received from the POD device, determines if the CA_System_ID contained in the encrypted video signal matches the CA_System_ID stored in the memory, and sends the decryption information to the POD device to enable decryption of the encrypted video signal if the two CA_System_IDs match each other,
   wherein the POD device uses the decryption information received from the host device to determine whether the user is authorized to access the channel, and decrypts the encrypted video signal based on the decryption information received from the host device, and, if the user is determined as not being authorized, the POD device does not decrypt the encrypted video signal, and
   wherein the memory to store the CA_System_ID is not included in the POD device.

6. The video processing system of claim 5, wherein the host device requests the POD device to send the CA_System_ID stored in the CA system to the host device in response to mounting the POD device in the host device.

7. The video processing system of claim 5, wherein the host device is deployed in a cable television system and the transmitter is a headend of the cable television system.

8. The video processing system of claim 5,
   wherein the encrypted video signal contains a first CA_System_ID and a corresponding first decryption information, and a second CA_System_and a corresponding second decryption information,
   wherein the host device is configured to determine whether each of the first CA_System_ID and the second CA_System_ID matches the CA_System_ID received from the CA system,
   wherein, if one of the first and second CA_System_IDs matches the CA_System_ID received from the CA system, the host sends to the POD device one of the first decryption information and the second decryption information which corresponds to the one of the first and second CA_System_IDs, and
   wherein if the one of the first decryption information and the second decryption information is received at the POD device, the POD device determines that the user is authorized to access the channel and decrypts the encrypted video signal.

9. A host apparatus for use in decrypting an encrypted video signal received, through a channel selected by a user, from a transmitter, the host apparatus comprising:

a tuner for receiving the encrypted video signal from a transmission station, the encrypted video signal comprising decryption information and conditional access (CA) information of the transmission station about a CA system that decrypts the encrypted video signal; and a processor which controls a memory, not included in a point of deployment device (POD) comprising the CA system to receive and store CA information about the CA system stored in the CA system in response to initialization of the POD, determines if the CA information of the transmission station about the CA system matches the CA information stored in the memory, and sends the decryption information to the POD to enable the encrypted video to be decrypted if it is determined that the two pieces of the CA information match each other, wherein the CA system of the POD device uses the decryption information received from the processor to determine whether the user is authorized to access the channel, and decrypts the encrypted video signal based on the decryption information received from the processor, and, if the user is determined as not being authorized, the CA system of the POD does not decrypt the encrypted video signal.

10. The host of claim 9, wherein the tuner receives the encrypted video signal from a headend of a cable television system by tuning to a frequency carrying the video signal.

11. The host apparatus of claim 9, wherein the encrypted video signal contains a first CA information and a corresponding first decryption information, and a second CA information and a corresponding second decryption information, wherein the host device is configured to determine whether each of the first CA information and the second CA information matches the CA information stored in the CA system, wherein, if one of the first and second CA information matches the CA information stored in the CA system, the host sends to the POD device one of the first decryption information and the second decryption information which corresponds to the one of the first CA information and the second CA information, and wherein if the one of the first decryption information and the second decryption information is received at the POD device, the POD device determines that the user is authorized to access the channel and decrypts the encrypted video signal.

12. A method of decrypting an encrypted video signal received, through a channel selected by a user, from a transmitter, the method comprising:

receiving at a host device an identifier of a conditional access (CA) system (CA_System_ID) of a point of deployment (POD) device, the host device comprising a memory unit, and the CA system being provided for decrypting the encrypted video signal;

storing the received CA_System_ID in the memory unit;

receiving at the host device, from the transmitter, the encrypted video signal comprising a CA_System_ID of the CA system and decryption information;

determining by the host device if the CA_System_ID included in the encrypted video signal matches the CA_System_ID stored in the memory;

sending by the host device the decryption information to the POD device if it is determined that the two CA_System_IDs match each other;

decrypting by the POD device the encrypted video signal based on the decryption information received from the host device, wherein the decryption information is used by the POD device for determining whether the user is authorized to access the channel, and, if the user is determined as not being authorized, the encrypted video signal is not decrypted in the decrypting the encrypted video signal, and wherein the memory to store the CA_System_ID is not included in the POD device.

13. The method according to claim 12, wherein the POD device sends the CA_System_ID of the POD device to the host device in response to an initialization action.

14. The method of claim 12, further comprising:

if the encrypted video signal contains a first CA_System_ID and a corresponding first decryption information, and a second CA_System_ID and a corresponding second decryption information, determining whether each of the first CA_System_ID and the second CA_System_ID matches the CA_System_ID stored in the memory; and if one of the first and second CA System IDs matches the CA_System_ID stored in the memory, decrypting the encrypted video signal based on one of the first decryption information and the second decryption information which corresponds to the one of the first and second CA_System_IDs, wherein by the one of the first decryption information and the second decryption information, it is determined that the user is authorized to access the channel, based on which the decrypting the encrypted video signal based on one of the first decryption information and the second decryption information is performed.

15. The method according to claim 13, wherein the initialization action is a request sent by the host device to the POD device in response to mounting the POD device in the host device.

16. The method according to claim 15, wherein said determining if the CA_System_ID contained in the encrypted video signal matches the CA_System_ID stored in the memory is performed by the host device.

17. The method according to claim 16, wherein the host device is deployed in a cable television system and the transmitter is a headend of the cable television system.

18. A video processing apparatus comprising:

a signal receiver receiving, through a channel selected by a user, an encrypted video signal which contains access rights information of a transmitting side and decryption information;

an information extractor extracting the access rights information of the transmitting side and the decryption information, from the received video signal;

a decryption processor decrypting the encrypted video signal based on the extracted decryption information;

an access rights information storage unit storing access rights information of a receiving side; and a controller sending the extracted decryption information to the decryption processor if it is determined that the access rights information of the transmitting side matches the access rights information of the receiving side stored in the access rights information storage unit, wherein if the extracted decryption information sent to the decryption processor is used by the decryption processor to determine whether the user is authorized to access the channel and decrypt the encrypted video signal, and wherein if the user is determined as not being authorized, the decryption processor does not decrypt the encrypted video signal, wherein the encrypted video signal contains a first access rights information of the transmitting side and a corresponding first decryption information, and a second access rights information of the transmitting side and a corresponding second decryption information, wherein the information extractor is configured to extract the first access rights information and the first decryption information, and the second access rights information and the second decryption information, wherein the controller is configured to determine whether each of the first access rights information and the second access rights information matches the access rights information of the receiving side, wherein if the controller determines that one of the first access rights information and the second access rights information matches the access rights information of the receiving side, the controller sends to the decryption processor one of the first decryption information and the second decryption information which corresponds to the one of the first access rights information and the second access rights, wherein if the one of the first decryption information and the second decryption information is received at the decryption processor, the decryption processor determines that the user is authorized to access the channel and decrypts the encrypted video signal, and wherein the access rights information storage unit storing access rights information of a receiving side is not included in the decryption processor.

19. A video processing apparatus comprising:

a signal receiver receiving, through a channel selected by a user, an encrypted video signal which contains access rights information of a transmitting side and decryption information;

an information extractor extracting the access rights information of the transmitting side and the decryption information, from the received video signal; and a controller controlling a storage unit to store the access rights information of the receiving side, and sending the decryption information to a decryption processing device if it is determined that the access rights information of the transmitting side extracted by the information extractor matches the access rights information of the receiving side, wherein if the decryption information sent to the decryption processing device is used by the decryption processing device to determine whether the user is authorized to access the channel and decrypt the encrypted video signal, and wherein if the user is determined as not being authorized, the decryption processing device does not decrypt the encrypted video signal, wherein the encrypted video signal contains a first access rights information of the transmitting side and a corresponding first decryption information, and a second access rights information of the transmitting side and a corresponding second decryption information, wherein the information extractor is configured to extract the first access rights information and the first decryption information, and the second access rights information and the second decryption information, wherein the controller is configured to determine whether each of the first access rights information and the second access rights information matches the access rights information of the receiving side, wherein if the controller determines that one of the first access rights information and the second access rights information matches the access rights information of the receiving side, the controller sends to the decryption processing device one of the first decryption information and the second decryption information which corresponds to the one of the first access rights information and the second access rights, wherein if the one of the first decryption information and the second decryption information is received at the decryption processing device, the decryption processing determines that the user is authorized to access the channel and decrypts the encrypted video signal, and wherein the storage unit to store the access rights information of the receiving side is not included in the decryption processing device.

* * * * *